United States Patent [19]
Aoyama

[11] Patent Number: 5,230,141
[45] Date of Patent: Jul. 27, 1993

[54] DEVICE FOR FEEDING APERTURED PARTS

[76] Inventor: Yoshitaka Aoyama, 20-11, Makitsukadai 2-cho, Sakai-shi, Osaka 590-01, Japan

[21] Appl. No.: 884,300

[22] Filed: May 13, 1992

Related U.S. Application Data

[63] Continuation of Ser. No. 573,114, Sep. 11, 1990, filed as PCT/JP90/00089, Jan. 25, 1990, abandoned.

[30] Foreign Application Priority Data

Jan. 25, 1989 [JP] Japan .................................. 1-15541

[51] Int. Cl.⁵ .......................... B23P 19/08; B23Q 7/10
[52] U.S. Cl. ........................................ 29/719; 29/810; 29/DIG. 95; 81/54; 81/125
[58] Field of Search ................. 29/445, 719, DIG. 95, 29/DIG. 105, 809, 810; 81/54, 125; 269/8

[56] References Cited

U.S. PATENT DOCUMENTS

| | | | |
|---|---|---|---|
| 2,763,173 | 9/1956 | Bailey et al. ........................ | 81/125 X |
| 2,953,049 | 9/1960 | Vilmerding ........................ | 81/125 X |
| 3,207,010 | 9/1965 | Wendling .......................... | 81/125 |
| 3,489,041 | 1/1970 | Hauenstein et al. ............... | 81/125 X |
| 3,630,108 | 12/1971 | Stillwagon, Jr. .................. | 31/125 |
| 3,864,804 | 2/1975 | Kawaguchi ....................... | 29/719 X |
| 4,270,237 | 6/1981 | Breeze, Jr. et al. ................ | 81/54 X |
| 5,035,039 | 7/1991 | Aoyama ............................. | 29/445 |

FOREIGN PATENT DOCUMENTS

| | | |
|---|---|---|
| 31973 | 3/1977 | Japan . |
| 112582 | 8/1977 | Japan . |
| 22702 | 7/1978 | Japan . |
| 29305 | 9/1979 | Japan . |

*Primary Examiner*—Mark Rosenbaum
*Assistant Examiner*—Peter Dungba Vo
*Attorney, Agent, or Firm*—Nikaido, Marmelstein, Murray & Oram

[57] ABSTRACT

A device for feeding apertured parts by inserting a guide rod for a feed rod into the aperture of a part in the temporarily secured state. This device is characterized in that the feed rod has a flat cross-section and the amount of removal of its material on one side thereof is greater than on the other side, and in that a part locking section is provided on the ceiling of the temporarily securing chamber on the side where the amount of removal is greater. Further, a guide member is provided which extends parallel with the guide rod for preventing rotation of parts. The length of the guide rod is less than that of the guide member to provide a rolling space for parts.

3 Claims, 1 Drawing Sheet

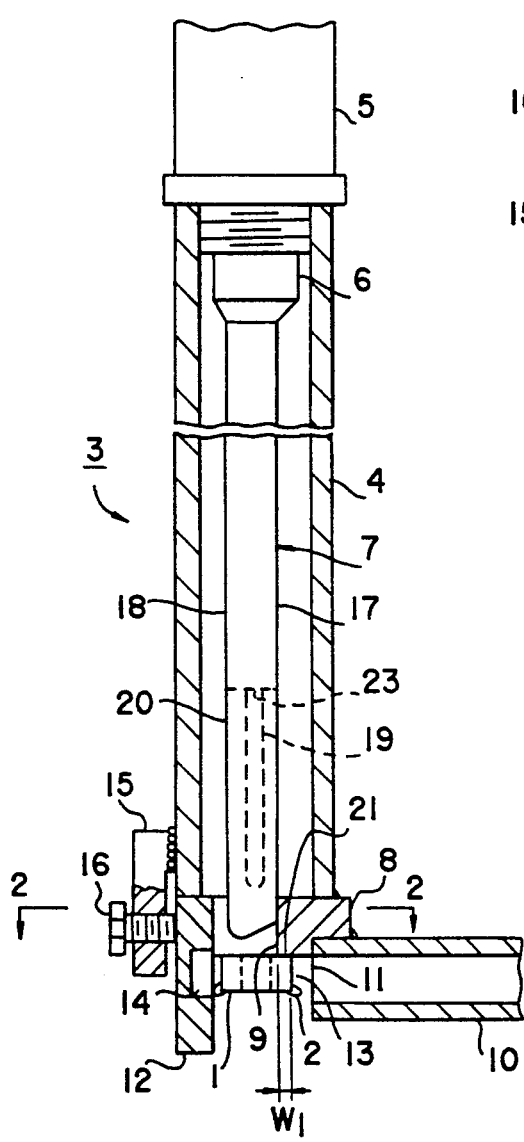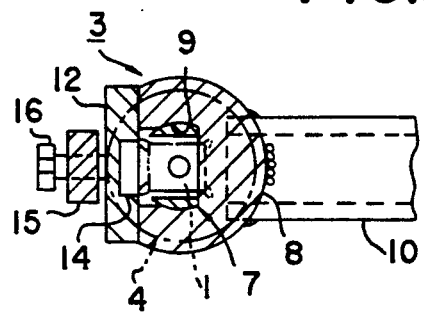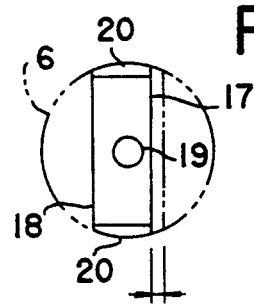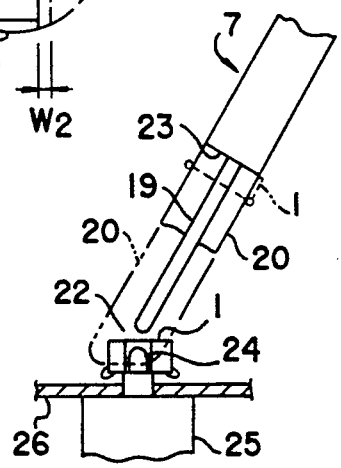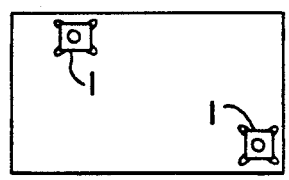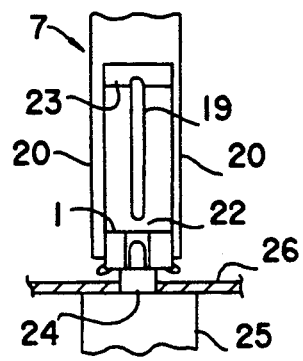

DEVICE FOR FEEDING APERTURED PARTS

This application is a continuation of application Ser. No. 573,114 filed Sep. 11, 1990, filed as PCT/JP90/00089, Jan. 25, 1990, now abandoned.

TECHNICAL FIELD

The invention is utilized in a field where the feeding of parts is effected by inserting a guide rod for a feed rod into the aperture of a part.

BACKGROUND ART

As for a prior technique relating to the present invention, there is one disclosed in Japanese Patent Application Disclosure No. 77470/1973. This uses a head member in the form of a block formed with a guide passage for parts and a through-hole for a feed rod having a flat cross section. Another prior technique is disclosed in Japanese Utility Model Publication No. 20195/1981, adapted to feed flat plate-like parts and comprising a main guide rod for setting the path of travel of parts and an auxiliary guide rod for preventing the rotation of parts.

According to the above-mentioned Patent Application Disclosure No. 77470/1973, since a temporary securing chamber is formed using the block-like head member, it is easy to form the ceiling of the temporarily securing chamber with an anchoring surface for parts; to do so, however, it would be necessary to use the block-like head member, a fact which is disadvantageous from the standpoints of space, weight and processing.

The technique disclosed in the other Japanese Utility Model Publication No. 20195/1981 is directed to flat plate-like parts and is not capable of obliquely downward feeding.

DISCLOSURE OF THE INVENTION

The present invention has been accomplished to solve the above-mentioned problem and provides a device for feeding apertured parts by inserting a guide rod for a feed rod into the aperture of a part in the temporarily secured state, said device being characterized in that the feed rod has a flat cross-section and the amount of removal of its material on one side thereof is greater than on the other side, and in that a part locking section is provided on the ceiling of the temporary securing chamber on the side where the amount of removal is greater, thereby making the conventional block-like head unnecessary.

The second form of the invention provides a device for feeding apertured parts by inserting a guide rod for a feed rod into the aperture of a part in the temporarily secured state, said device being characterized in that a guide member is provided for preventing rotation of parts extending parallel with the guide rod, the length of said guide rod being less than that of said guide member to provide a rolling space for parts. This rolling space allows smooth mounting of a part on a mating member and prevents rotation of the part in the mounted state.

According to the invention, since the amount of removal of the material of the feed rod of flat cross-section is greater on one side than on the other, the ceiling of the temporary securing chamber can be reliably provided with a part locking section, whereby temporary securing of a part is accomplished in the correct position, allowing reliable delivery of the part during the advance stroke of the feed rod.

Further, since the respective lengths of the guide rod and guide member are set in the relation described above to provide the rolling space, a part will smoothly coincide with a mating member, e.g., a positioning pin for a fixed electrode and since prevention of rotation of parts is attained during the rolling transition period and even after the mounting of the part, the welding of a nut or the like along the end edge of a steel plate part can be effected, as shown in FIG. 6.

BRIEF DESCRIPTION OF THE DRAWING

The drawing shows an embodiment of the invention.
FIG. 1 is a longitudinal sectional view;
FIG. 2 is a sectional view taken along the line 2—2;
FIG. 3 is a plan view of a feed rod;
FIG. 4 is a side view;
FIG. 5 is a plan view; and
FIG. 6 is a plan view.

BEST MODE FOR EMBODYING THE INVENTION

The invention will now be described in detail with reference to the drawing. An apertured part in this embodiment is a projection nut 1 having projections 2 for mounting. The entire device is denoted by the numeral 3, comprising a sleeve 4 and an air cylinder 5 connected to the upper end of said sleeve, with a main shaft 6 of circular cross section extending from said air cylinder and connected to a feed rod 7.

An end plate 8 is welded to the lower end of the sleeve 4 and formed with a through-hole or cut-away portion 9 through which the feed rod 7 extends. A guide tube 10 for transporting nut 1 is welded to the end plate 8 and a stop plate 12 is installed in opposed relation to the opening 11 thereof. The space surrounded by the end plate 8, the opening 11 of the guide tube and the stop plate 12 serves as a temporary securing chamber 13 for temporarily receiving the nut 1, the lower side of the temporary securing chamber 13 being open.

There are various means for temporarily locking the nut 1; in the illustrated example, a magnet (permanent magnet) 14 is embedded in the stop plate 12. Alternatively, an opening and closing plate may be installed in the lower side of the temporary securing chamber 13. A bolt 16 is screwed into an arm 15 welded to the sleeve 4, thereby pressing the stop plate 12 against the end plate 8 to fix the stop plate in position.

As is clear from FIGS. 1 and 3, the feed rod 7, when taken in its cross-section, and as in the illustrated case, is in the form of the main shaft 6 of circular cross-section cut away on its opposite sides, thereby forming parallel flat lateral surfaces 17 and 18. The feed rod 7 has a guide rod 19 joined thereto, and disposed parallel thereto are guide members 20 for prevention of rotation of the nut about its axis. In the illustrated case, a total of two guide members 20 are provided on opposite sides of the guide rod 19.

In order to temporarily lock the nut 1 stably in the temporary securing chamber 13, it is desirable that the nut be in surface contact with the ceiling of the temporary securing chamber 13 (namely, the lower surface of the end plate 8) at least slightly. The contact portion is a part locking section 21 in FIG. 1, having a width $W_1$. To obtain the width $W_1$, the amount of removal of the material of the lateral surface 17 is made greater than that of the lateral surface 18 and this is indicated by $W_2$.

That is, the amount removed at $W_2$ is added to $W_1$. In other words with the amount $W_2$ removed from the lateral surface 17, the lateral surface 17 is closer to the guide rod 19 when compared to that of the lateral surface 18.

The guide rod 19 is shorter than the guide members 20, whereby the rolling space 22 (or pivot space 22) for parts (see FIG. 4) is provided.

FIG. 1 shows a state in which the nut 1 coming in through the guide tube 10 has been attracted by the magnet 14 in the temporary securing chamber 13. When the feed rod 7 starts to descend, the guide rod 19 enters the threaded hole as the nut 1 is held between the guide members 20. When the upper surface of the nut 1 abuts against the push-down surface 23 of the feed rod, the nut 1 is pushed down against the force of attraction of the magnet 14. When the advance of the feed rod 7 stops at the position shown in phantom lines in FIG. 4, the nut 1 slides under the inertial force along the guide rod 19 until it coincides with a positioning pin 24 in the rolling space 22. The rolling space 22 serves to establish the state in which the guide rod 19 and the positioning pin 24 are disposed close to each other with the guide members 20 functioning to prevent rotation of the nut 1; even after the mounting, the rotation of the nut 1 is prevented.

The positioning pin 24 retractably projects from a fixed electrode 25, a steel plate part 26 is mounted in advance and the nut 1 is placed thereon. FIG. 5 is a sectional view taken from the left-hand side of FIG. 4; how the guide members 20 prevent axial rotation will be fully understood well.

While the invention has been particularly shown and described in reference to preferred embodiments thereof, it will be understood by those skilled in the art that changes in form and details may be made therein without departing from the spirit and scope of the invention.

What is claimed is:

1. A device for feeding apertured parts, comprising:
a feed rod having at one end a push-down surface and a guide rod and first and second guide members projecting from said push-down surface, said guide rod being insertable within an aperture of a part temporarily secured by a magnet located at a side of said feed rod to enable said push-down surface to push said part away from said magnet;
said feed rod having opposite sides cut away to form parallel lateral surfaces, one of said lateral surfaces being closer to the guide rod than the other;
said first and second guide members being opposed parallel to one another and extending along opposite sides of said guide rod for preventing axial rotation of said part;
wherein said guide rod has a length which is less than lengths of said guide members to provide a space for said part to pivot to a mounted position without rotation.

2. A device according to claim 1 wherein a front end of said guide member is arranged at a slant.

3. A device according to claim 1 further comprising:
a temporary part securing chamber having a part locking section located in an upper part thereof;
said feed rod being axially movable within a sleeve having an end plate at one end thereof, said feed rod extending through a cut-away portion in said end plate; and
said cut-away portion of said end plate having a flat surface abutting said one lateral surface to form said part locking section located on a same side of said feed rod as said one surface.

* * * * *